(12) United States Patent
Wei et al.

(10) Patent No.: US 7,940,261 B2
(45) Date of Patent: May 10, 2011

(54) AUTOMATIC LOAD BALANCING OF A 3D GRAPHICS PIPELINE

(75) Inventors: Jian Wei, San Diego, CA (US); James M. Brown, San Diego, CA (US); David Wu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1156 days.

(21) Appl. No.: 11/621,917

(22) Filed: Jan. 10, 2007

(65) Prior Publication Data

US 2008/0165199 A1    Jul. 10, 2008

(51) Int. Cl.
*G06T 15/00*  (2011.01)
(52) U.S. Cl. ........................ 345/419; 345/506
(58) Field of Classification Search .................. None
See application file for complete search history.

(56) References Cited

U.S. PATENT DOCUMENTS

| | | | | |
|---|---|---|---|---|
| 5,136,664 | A * | 8/1992 | Bersack et al. | 382/304 |
| 5,230,064 | A * | 7/1993 | Kuo et al. | 345/505 |
| 6,111,582 | A * | 8/2000 | Jenkins | 345/421 |
| 6,222,550 | B1 * | 4/2001 | Rosman et al. | 345/419 |
| 6,246,421 | B1 * | 6/2001 | Omori | 345/505 |
| 6,640,299 | B1 * | 10/2003 | Mang et al. | 712/245 |
| 7,038,685 | B1 * | 5/2006 | Lindholm | 345/501 |
| 2002/0168090 | A1 * | 11/2002 | Bruce et al. | 382/101 |
| 2005/0041031 | A1 * | 2/2005 | Diard | 345/505 |
| 2005/0068325 | A1 * | 3/2005 | Lefebvre et al. | 345/522 |
| 2007/0030279 | A1 * | 2/2007 | Paltashev et al. | 345/506 |
| 2007/0165035 | A1 * | 7/2007 | Duluk et al. | 345/506 |
| 2007/0222787 | A1 * | 9/2007 | Lefebvre et al. | 345/522 |
| 2008/0129743 | A1 * | 6/2008 | Bakalash et al. | 345/502 |
| 2008/0136827 | A1 * | 6/2008 | Bakalash et al. | 345/502 |

OTHER PUBLICATIONS

International Search Report, PCT/US08/050654, International Search Authority, European Patent Office, May 21, 2008.
Written Opinion, PCT/US08/050654, International Search Authority, European Patent Office, May 21, 2008.
Crockett, "An Introduction to Parallel Rendering," Parallel Computing, Elsevier Publishers, Jul. 1997, pp. 819-843, vol. 23, No. 7, Elsevier Publishers, Amsterdam, NL, XP004729969.
Kunii et al., "Parallel Polygon Rendering on the Graphics Computer VC-1," Parallel Algorithms/Architecture Synthesis, 1995 Proceedings, First AIZU International Symposium on Fukushima, Japan, Mar. 15, 1995, pp. 2-9, IEEE Computer Society, Los Alamitos, CA, USA, XP010139376.
Kawai et al., "Evaluation of Parallel Ray Tracing Algorithm Using Screen Space Subdivision for Image Generation System MAGG," Systems and Computers in Japan, 1994, pp. 78-87, vol. 15, No. 11, XP002477481.

* cited by examiner

*Primary Examiner* — Andrew Wang
*Assistant Examiner* — David H Chu

(57) ABSTRACT

A device has a processor for processing a vertex processing stage, a sub-screen dividing stage and a pixel rendering stage of a three-dimensional (3D) graphics pipeline. The processor includes processing threads which balance the work load of the 3D graphics pipeline by prioritizing processing for the pixel rendering stage over other stages. Each processing thread, operating in parallel and independently, checks a level of tasks in a Task list of sub-screen tasks. If the level is below a threshold value, empty or the sub-screen tasks are all locked, the processing thread loops to the vertex processing stage. Otherwise, the processing thread processes a sub-screen task during the pixel rendering stage.

30 Claims, 15 Drawing Sheets

AUTOMATIC LOAD BALANCING OF A 3D GRAPHICS PIPELINE

BACKGROUND

I. Field

The present disclosure relates generally to image processing, and more specifically to techniques for load balancing a three-dimensional (3D) graphics pipeline for quick pixel rendering processing processed by an interleaved multi-threaded processor.

II. Background

Converting information about 3D objects into a bit map that can be displayed is known as pixel rendering, and requires considerable memory and processing power. In the past, 3D graphics were available only on powerful workstations, but now 3D graphics accelerators are commonly found in personal computers (PC). The hardware graphics accelerator contains memory (e.g. instruction random access memory (IRAM)) and a specialized microprocessor to handle many of the 3D rendering operations. Open GL® (Open Graphics Library) for desktops defines an application programming interface (API) for writing applications that produce 3D and 2D computer graphics. The API includes hundreds of functions for drawing complex three-dimensional scenes from primitives.

OpenGL® ES is a subset of the desktop OpenGL® which creates an interface between software and graphics. The 3D Graphics Engine (OpenGL®ES) is implemented into generally two parts. The first part includes those functions which process the vertex and is typically implemented in the digital signal process (DSP) firmware. The second part includes those functions for pixel rendering and are implemented in a dedicated hardware graphics accelerator. The second part which performs the pixel rendering is the last pipeline stage of a conventional 3D graphics engine. The last pipeline stage processes input triangle sets to produce a pixel representation of the graphics image. However, the last pipeline stage is typically the performance bottle neck of the entire 3D graphics pipeline in the engine. Therefore, it is very important to improve the performance (in pixel per second) of the last pipeline stage for pixel rendering.

Typically, during pixel rendering operations, each input triangle needs to be processed sequentially, in the same order as the triangles are input. Thus, a processor with multi-threads is prevented from utilizing interleaved parallel processing to process an input triangle.

Furthermore, the hardware graphics accelerators are not generally flexible or easily scalable. Thus, the hardware graphics accelerators cannot easily add new features, support higher versions of the 3D graphics standard (such as OpenGL®ES 1.0, 1.1 . . . ), support different application configurations and customize requirements. Furthermore, the hardware graphics accelerators are not easily scaled for different performance requirements (frame rate, screen size, pixel rate, triangle rate, etc. . . . ), to optimize silicon cost and system power consumption.

As can be readily seen, a dedicated hardware graphics accelerator takes up silicon area in small handheld computing devices, such as a mobile or cellular telephone. Accordingly, a dedicated hardware graphics accelerator increases the overall cost of a handheld computing device by the inclusion of the dedicated hardware graphics accelerator and IRAM used. The use of a dedicated hardware graphics accelerator also produces data traffic with the DSP which adds overhead and consumes power.

There is therefore a need in the art for techniques to load balance a three-dimensional (3D) graphics pipeline to provide quicker pixel rendering processing.

SUMMARY

Techniques for a three-dimensional (3D) graphics pipeline which provide quicker pixel rendering processing without a dedicated hardware graphics accelerator are described herein. In an aspect, a processor is implemented comprising a plurality of processing threads. Each processing thread determines whether a sub-screen task for pixel rendering operations is available in a task list. Each processing thread further performs the pixel rendering operations on the sub-screen task, if the sub-screen task is available. However, if the sub-screen task is not available, each processing thread performs a vertex processing operation to balance a work load of a three-dimensional (3D) graphics pipeline.

In another aspect, a wireless device is implemented comprising a processor having a plurality of processing threads. Each processing thread prioritizes the pixel rendering operations of a three-dimensional graphics pipeline over the vertex processing operations when data is available for the pixel rendering operations. The processor is coupled to memory.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Many game applications, require three-dimensional (3D) graphics applications with display 3D objects in a two-dimensional (2D) space (e.g., a display screen). The pixels in a 2D graphics have the properties of position, color, and brightness while a 3D pixel adds a depth property that indicates where the point lies on an imaginary Z-axis. Texture is created as 3D pixels are combined, each with its own depth value.

Figure 1:
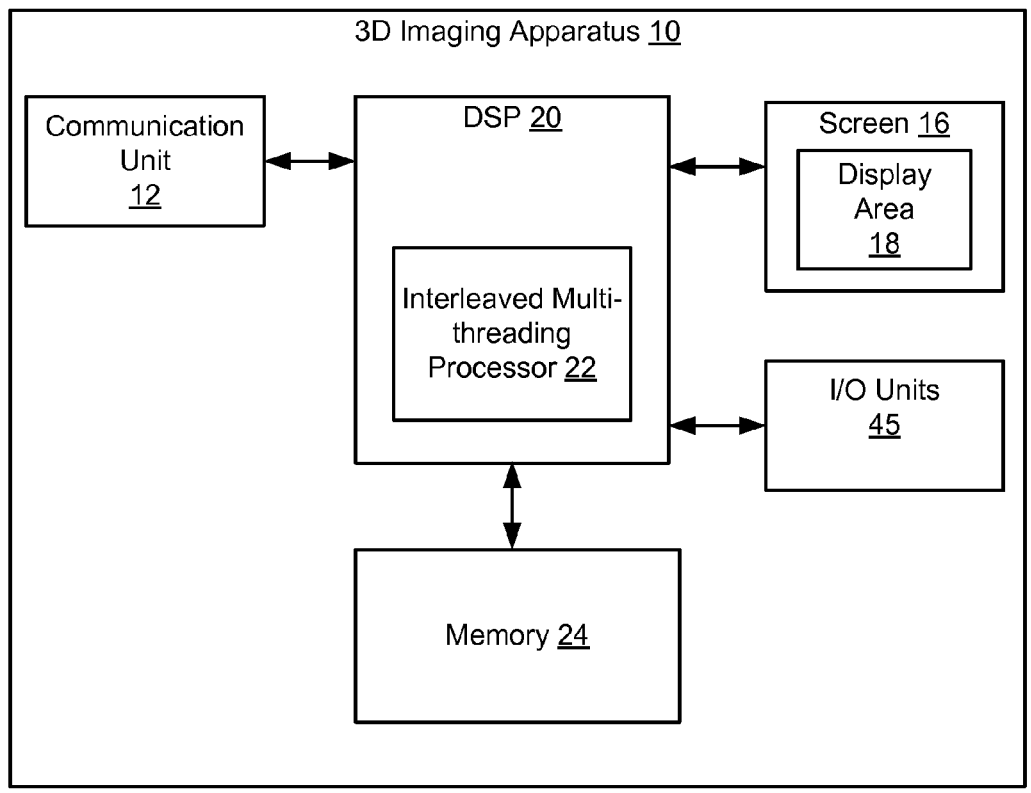
FIG. 1 illustrates a general block diagram of a 3D imaging apparatus.

Referring now to FIG. 1, an embodiment of a 3D imaging apparatus, generally designated at 10, is shown. The 3D imaging apparatus 10 includes a communication unit 12, a digital signal processor (DSP) 20, a screen 16 with a display area 18, a memory 24 and input/output (I/O) units 45. The shared memory 24 may store game applications or other applications (i.e. for two-way communications with wired or wireless networks, and other software applications) as desired by the user or to support the feature set of the apparatus 10. The I/O units 45 may include a keypad, keyboard or data communication ports. The screen 16 is operable to display in the display area 18 2D information as well as 3D graphics.

The 3D imaging apparatus 10 may include one of a personal digital assistant (PDA), and a mobile, cellular or satellite telephone, a laptop, Notebook, Tablet PC, Palm Pilot, wireless communications device or the like.

Referring now to FIGS. 2-5, in the exemplary embodiment, the DSP 20 includes an interleaved multi-threading processor 22. The interleaved multi-threading processor 22 has a plurality of processing threads (PT) PT1, PT2, . . . PTX. Each processing thread (PT) PT1, PT2, . . . PTX shares the same memory denoted as shared memory 24. Each processing thread PT1, PT2, . . . PTX includes a respective one set of instructions $26_1 \ldots 26_X$, a core $27_1 \ldots 27_X$ (processing unit) and a register file $28_1 \ldots 28_X$. The output of each core $27_1 \ldots 27_X$ communicates with the shared memory 24. The instructions $26_1 \ldots 26_X$ include the programming code for carrying out the operations defined below and other operations for carrying out the feature set, such as multi-media of the 3D imaging apparatus 10. The core $27_1 \ldots 27_X$ executes the instructions $26_1 \ldots 26_X$.

The register file $28_1 \ldots 28_X$ is a set of general purpose registers and is the center stage of the DSP 20 or a microprocessor. These register files $28_1 \ldots 28_X$ hold all the operands (typically loaded from memory), that is, hold all the results from all operations (such as arithmetic op, logic op, etc. ) before storing the results into the shared memory 24.

Some DSP architectures have four threads. Nevertheless, the DSP 20 can have more than four threads such as, without limitation, six processing threads which run in parallel. In the exemplary embodiment, each thread (PT) PT1, PT2, . . . PTX in parallel provides 100 million instruction packets per second (MIPS). Each instruction packet can be four (4) instructions, two (2) instructions (Sup-scalar) or just one instruction. However, one instruction is not recommended for efficiency, because the architecture of the DSP 20 removes the inefficiency caused by inter-instruction data dependency.

The terms thread or multi-threading are used to describe concurrent task execution. Instead of a single path of execution, a program (Operations) may be split into multiple execution threads which execute simultaneously. In the exemplary embodiment, there is a starting thread which requires a function call (or instruction), and usually requires at least two arguments: (1) the address of the start instruction; and (2) a context argument. While a thread is operating and/or exiting, the thread needs to be able to do two basic jobs in relation to other processing threads: (1) acquire a shared resource and block other threads from using such resource; and (2) safely send messages to other threads (e.g. done, ready, etc. )

Figure 4:
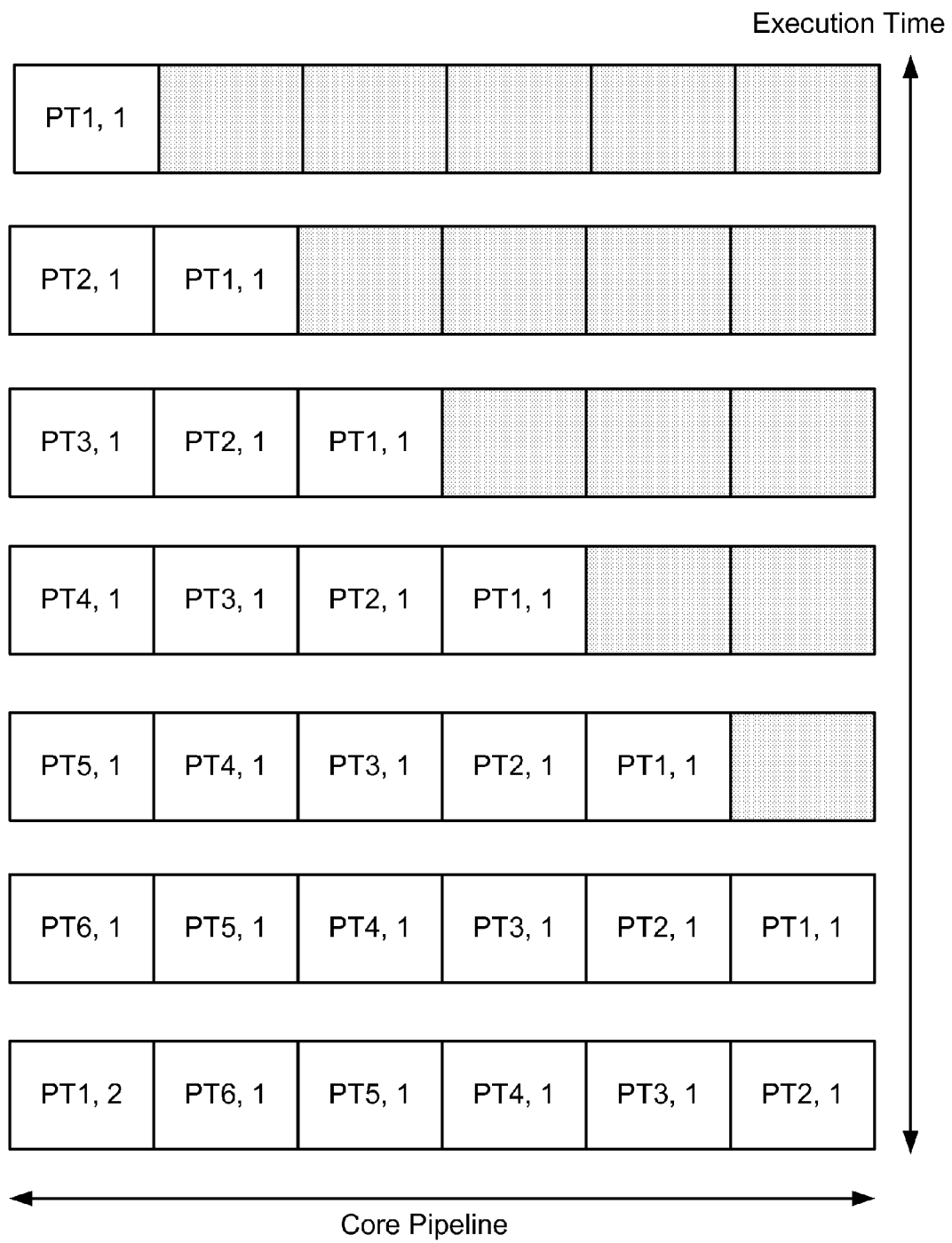
FIG. 4 illustrates a graph of the execution time verses the core pipeline of the interleaved instructions processed by the multi-threading processor with six threads.

Referring now to FIG. 4, a graph of the interleaved multi-threading parallel processing is shown. In this example, there are six (6) processing threads PT1, PT2, PT3, PT4, PT5 and PT6. The first processing thread PT1 processes a first instruction set 1. This is represented by the first (top) row of the execution time line for the core pipeline. The core pipeline is denoted by cores $27_1, \ldots 27_X$. While the first instruction set 1 is processed by the first processing thread PT1, the second processing thread PT2 processes its first instruction set 1. This is represented by the second row of the execution time line. Thus, the first instruction sets 1 are being parallel processed.

The third processing thread PT3 processes its first instruction set 1 while the first and second processing threads PT1 and PT2 process their first instruction sets 1. This is represented by the third row of the execution time line for the core pipeline. The fourth processing thread PT4 processes its first instruction set 1. Meanwhile, the first, second and third processing threads PT1, PT2 and PT3 continue processing their associated first instruction sets 1. This is represented by the fourth row of the execution time line for the core pipeline.

The fifth processing thread PT5 processes its first instruction set 1 while the first, second, third and fourth processing threads PT1, PT2, PT3 and PT4 continue processing their first instruction sets 1. This is represented by the fifth row of the execution time line for the core pipeline. The sixth processing thread PT6 processes its first instruction set 1 while the first, second, third, fourth and fifth processing threads PT1, PT2, PT3, PT4 and PT5 continue processing their first instruction sets 1. This is represented by the sixth row of the execution time line for the core pipeline. Thus, the processing of instructions by the processing threads is interleaved.

Referring now to the seventh (bottom) row of FIG. 4, assuming that the first processing thread PT1 has completed its first instruction set 1, the first processing thread PT1 begins processing a second instruction set 2 while the second, third, fourth, fifth and sixth processing threads PT2, PT3, PT4, PT5 and PT6 continue processing their first instruction sets 1. Hence, the processing of each of the processing threads PT1, PT2, . . . PTX are in parallel and interleaved.

Figure 5:
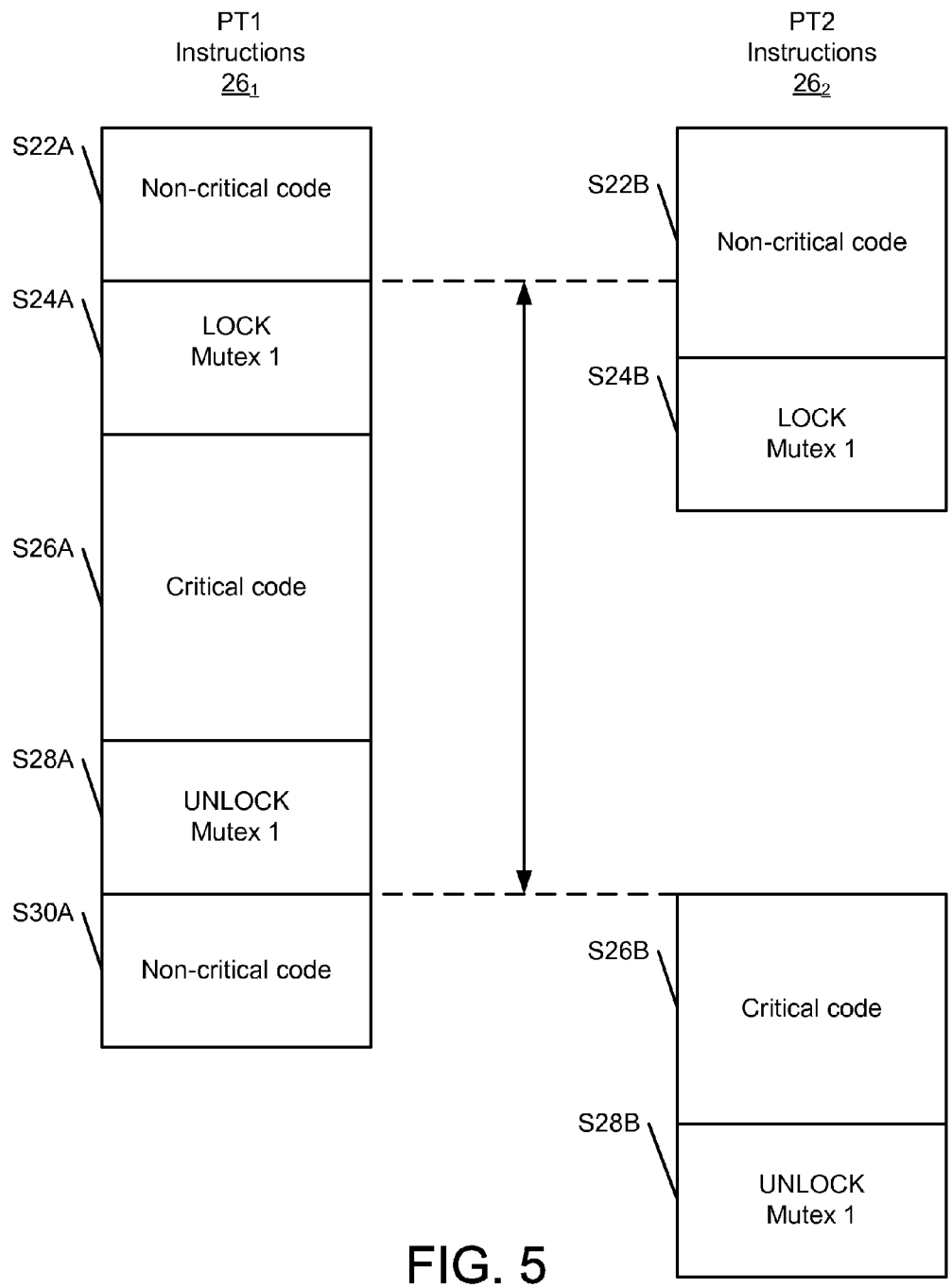
FIG. 5 illustrates two parallel instruction sets processed by two threads.

Describing the interleaved processing for all processing threads is prohibitive. Thus, for illustrative purposes, the interleaved processing using instructions $26_1$ and $26_2$ is shown in FIG. 5 as it relates to a mutex. A mutex is a tool that is "owned" by only one processing thread at a time. When a processing thread tries to acquire a mutex, it LOCKS the mutex. However, if the mutex is already LOCKED, that processing thread is halted. When the owning thread UNLOCKS the mutex, the halted thread is restarted and acquires ownership of the mutex. This process is shown in FIG. 5.

Starting with the first processing thread PT1, instructions $26_1$ beings with step S22A where non-critical code is executed. Step S22A is followed by step S24A where the first processing thread PT1 executes a LOCK mutex 1 instruction (assuming, the mutex 1 is UNLOCKED). Thus, the first processing thread PT1 now owns the mutex 1. Step S24A is followed by step S26A where critical code is executed. Step S26A is followed by step S28A where after the critical code is completed, the first processing thread PT1 executes an UNLOCK mutex 1 instruction. Thereafter, the first processing thread PT1 resumes execution of non-critical code at step S30A.

In parallel with the first processing thread PT1, the second processing thread PT2 begins instructions $26_2$ at step S22B where non-critical code is executed. Step S22B is followed by step S24B where the second processing thread PT2 wants to LOCK the mutex 1 at step S24B. However, the mutex 1 is in a LOCKED state. Thus, the operations of the second processing thread PT2 are halted until the first processing thread PT1 UNLOCKS the mutex 1 at step S28A. Then step 26B commences where the critical code may be executed. Step S26B is followed by step S28B where after the critical code is completed, the second processing thread PT2 executes an UNLOCK mutex 1 instruction. Other instructions may continue thereafter.

The mutex tool or another token tool is used to guarantee serial execution of critical sections in different processing threads only as needed. This is also serializing execution which means that certain code may not be executed in parallel when it could conflict with the execution of code by other threads. The mutex tool is helpful because a shared memory 24 (shared resource) is used.

Figure 6:
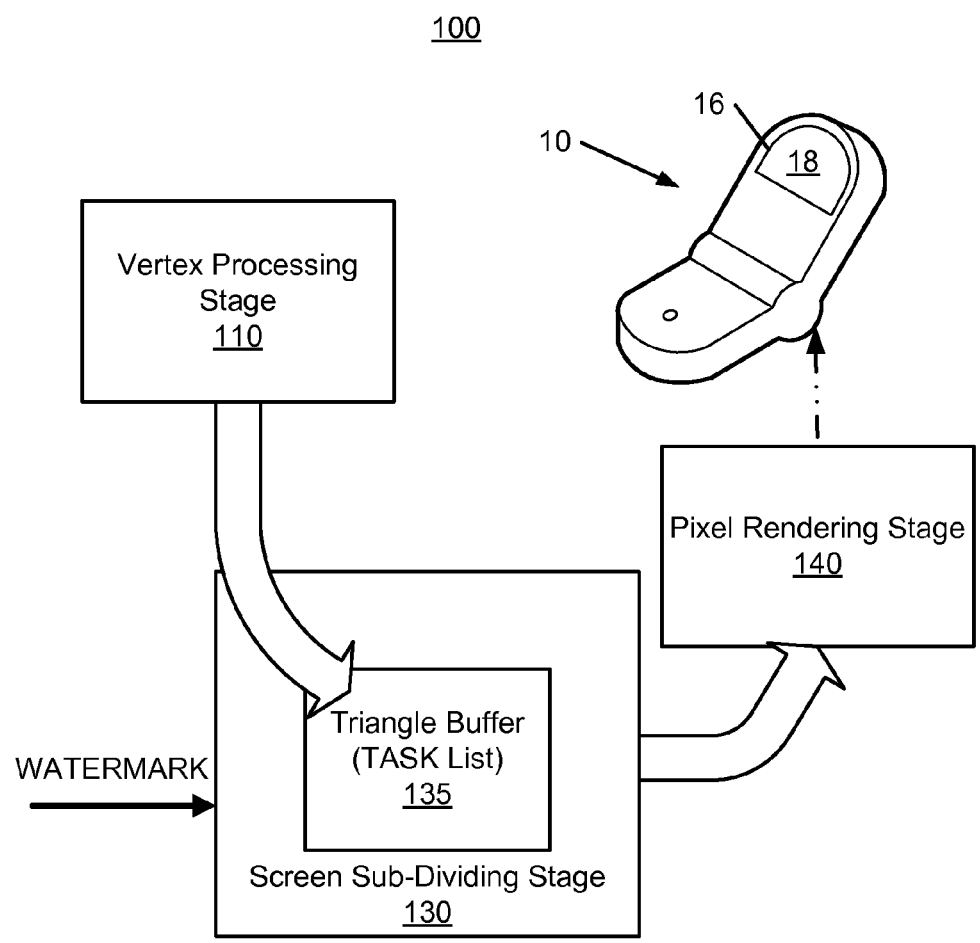
FIG. 6 illustrates a general flow diagram of the 3D graphics pipeline in an exemplary 3D imaging apparatus.
Figure 7:
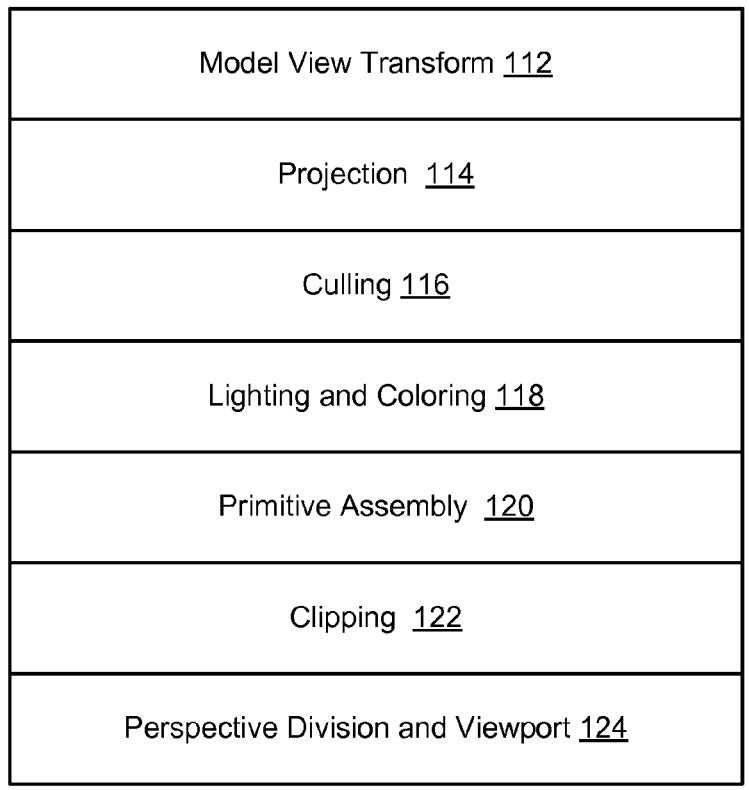
FIG. 7 illustrates a general block diagram of the processes of the 3D graphics pipeline.
Figure 7:
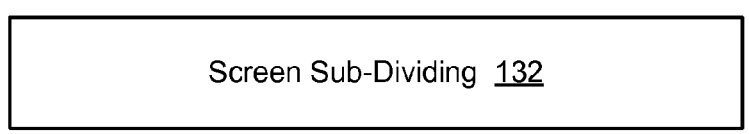
Figure 7:
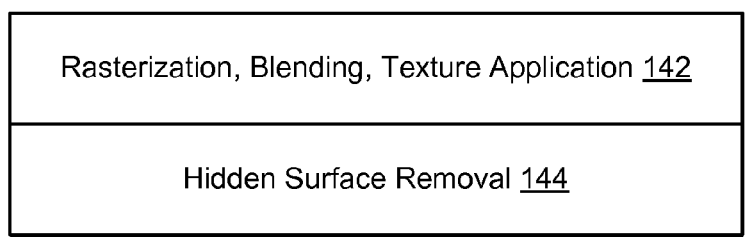

Referring now to FIGS. 6 and 7, there is shown an embodiment of a general flow and block diagrams of the 3D graphics pipeline, generally designated at 100. The 3D graphics pipeline 100 divides the entire task of 3D representation in the display area 18 of screen 16 into generally three (3) pipeline stages: a vertex processing (VP) stage 110, a screen sub-dividing (SSD) stage 130 and a pixel rendering (PR) stage 140. In operation, the vertex processing (VP) stage 110 includes all the functions or a subset of the functions currently implemented in the OpenGL® or OpenGL®ES and is processed by a digital signal processor (DSP) 20. The line to the screen 16 is shown in phantom because the screen 16 is not part of the 3D graphics pipeline 100.

The VP stage 110 includes model view transform operations 112, projection operations 114, culling operations 116, lighting and coloring operations 118, primitive assembly operations 120, clipping (i.e. user-defined clipping) operations 122, and perspective division and viewport operations 124. Each of these operations of the VP stage 110 are well defined in the OpenGL® or OpenGL® ES.

In general, the model view transform operations 112 use math operations to place object models into desired positions and orientations. The projection operations 114 use math operations that make close things large and far things smaller. Occlusion draws near objects in front of far ones. Culling and clipping operations 116 and 122 discard things that are not in view. Lighting operations 118 calculate the effects of lights on surfaces.

Figure 2:
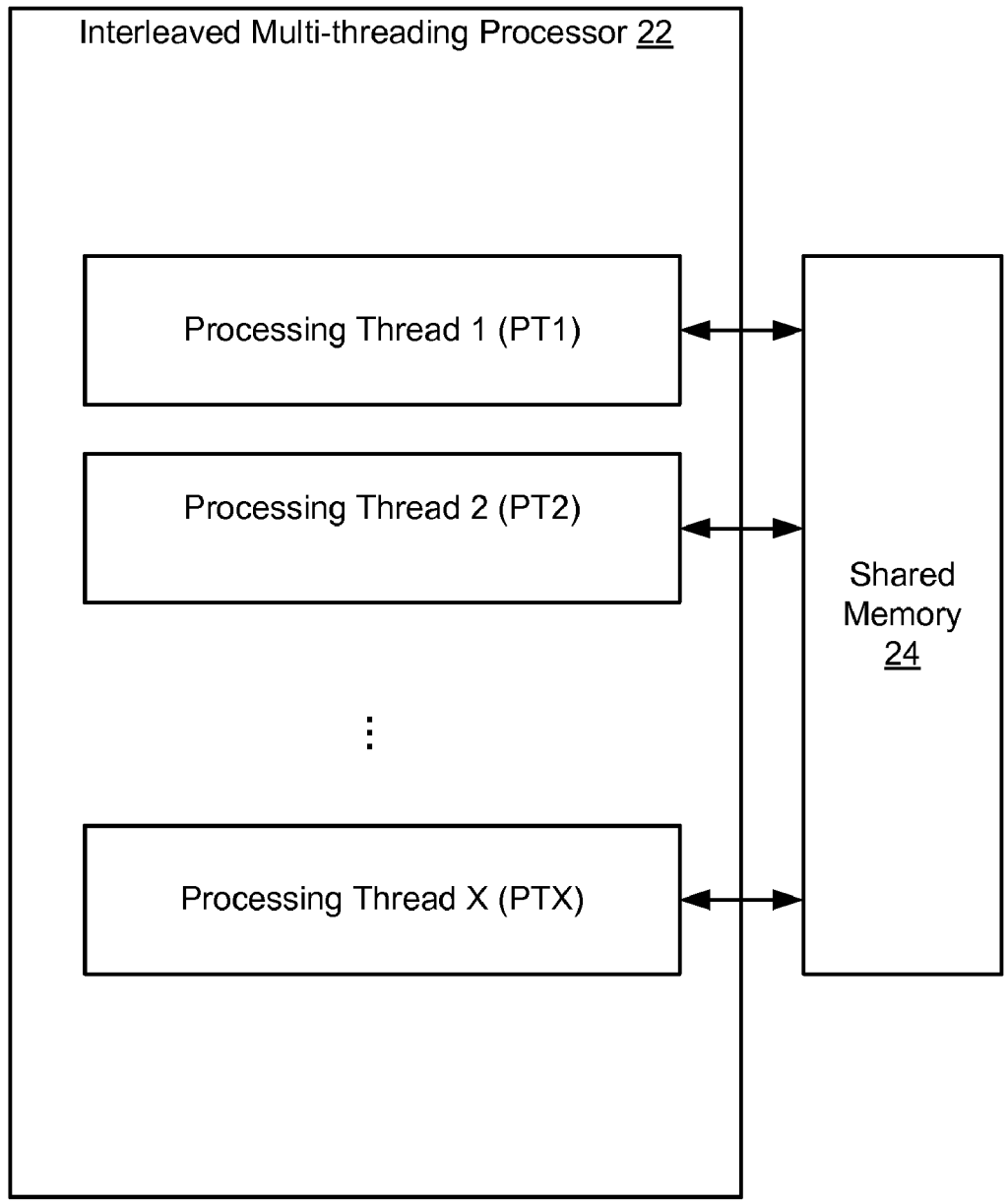
FIG. 2 illustrates an interleaved multi-threading processor interfaced with shared memory.
Figure 3:
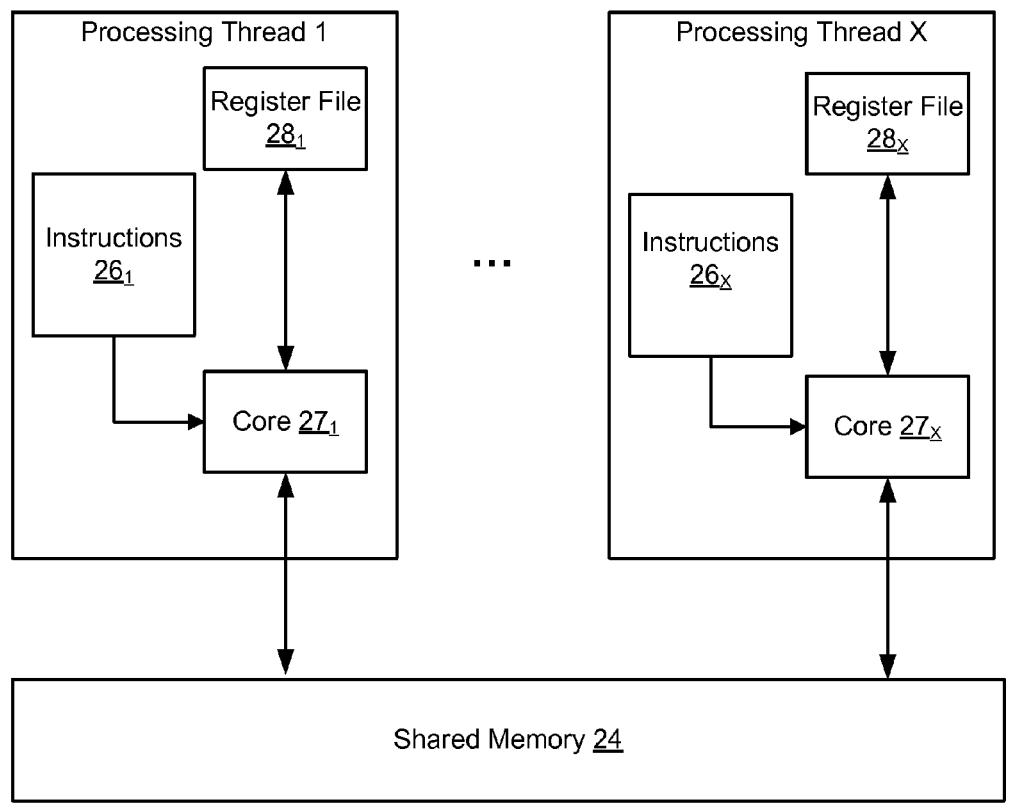
FIG. 3 illustrates details of the interleaved multi-threading processor with details of each thread shown.

In the exemplary embodiment, the VP stage 110 can be implemented with one processing thread (FIGS. 2 and 3). The vertex output information includes vertex information to define a triangle and its location in the display area 16. The vertex output information is superimposed on the display area 16 in that the pixels of the display area 16 include the vertex output information to define triangles in accordance with the OpenGL®, OpenGL® ES or other graphics libraries.

Figure 11:
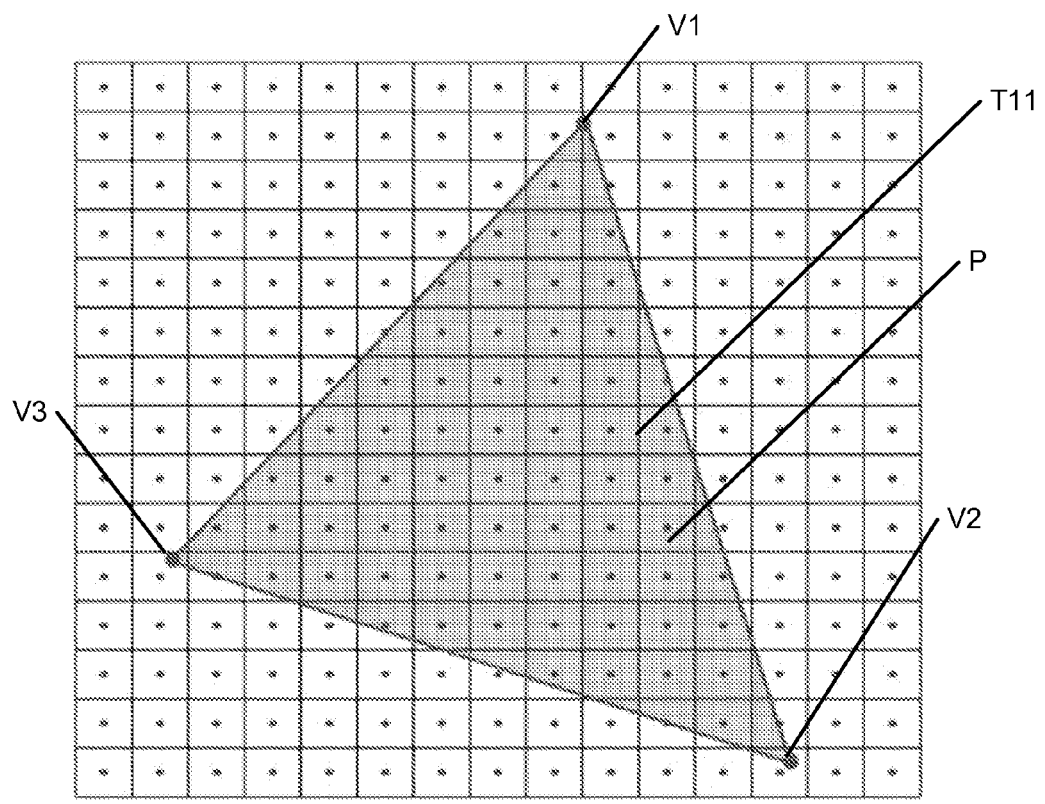
FIG. 11 illustrates a triangle defined by vertex coordinates with a plurality of pixels.

The screen sub-dividing (SSD) stage 130 includes screen sub-dividing operations 132 which divide the display area 18 into M*N sub-screens. The display area 18 is made up of a plurality of pixels P (FIG. 11) with the vertex output information superimposed. The vertex information from the VP stage 110 provides vertex information (such as V1, V2 and V3 of FIG. 11) defining triangles (such as, T1, and T2 of FIG. 8A) for superposition in the display area 18. The vertex information may include vertex coordinates and edge information. In general, the vertex output information for each triangle is just a set of mathematical descriptions to define a closed area. This set of math-descriptions is stored in the shared memory 24 so that each processing thread (PT1, PT2, . . . PTX) can use the set of math descriptions to compute each pixel P (FIG. 11) within its own sub-screen task and decide if the pixel is inside a triangle or not.

Figures 8A, 8B:
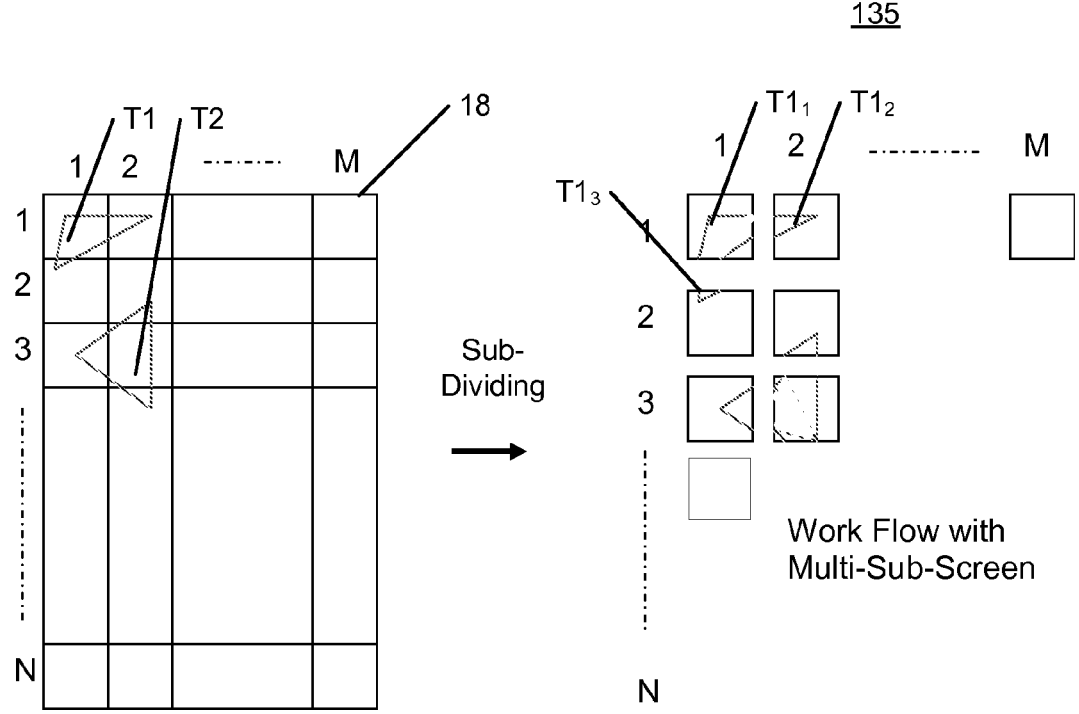
FIG. 8A illustrates the display space being sub-divided into a M×N grid where M>1 and N>1.
FIG. 8B illustrates the TASK list for processing the sub-divided display space of FIG. 8A.

FIG. 8A illustrates vertex output information superimposed on the display area 18. During the screen sub-dividing (SSD) stage 130 the display area 18 is sub-divided by dividing or grouping the pixels that makeup the display area 18 into M×N sub-screen tasks as best seen in FIG. 8B. The M×N sub-screen tasks are stored in Task list 135 (FIGS. 6 and 8B). The M×N sub-screen tasks are M×N independent tasks stored in the shared memory 24. The operations of the SSD stage 130 can be implemented using a processing thread which is separate from the processing thread used during the VP stage 110. Alternately, the operations of the SSD stage 130 can be combined with the operations of the VP stage 110 on the same processing thread.

Figure 9:
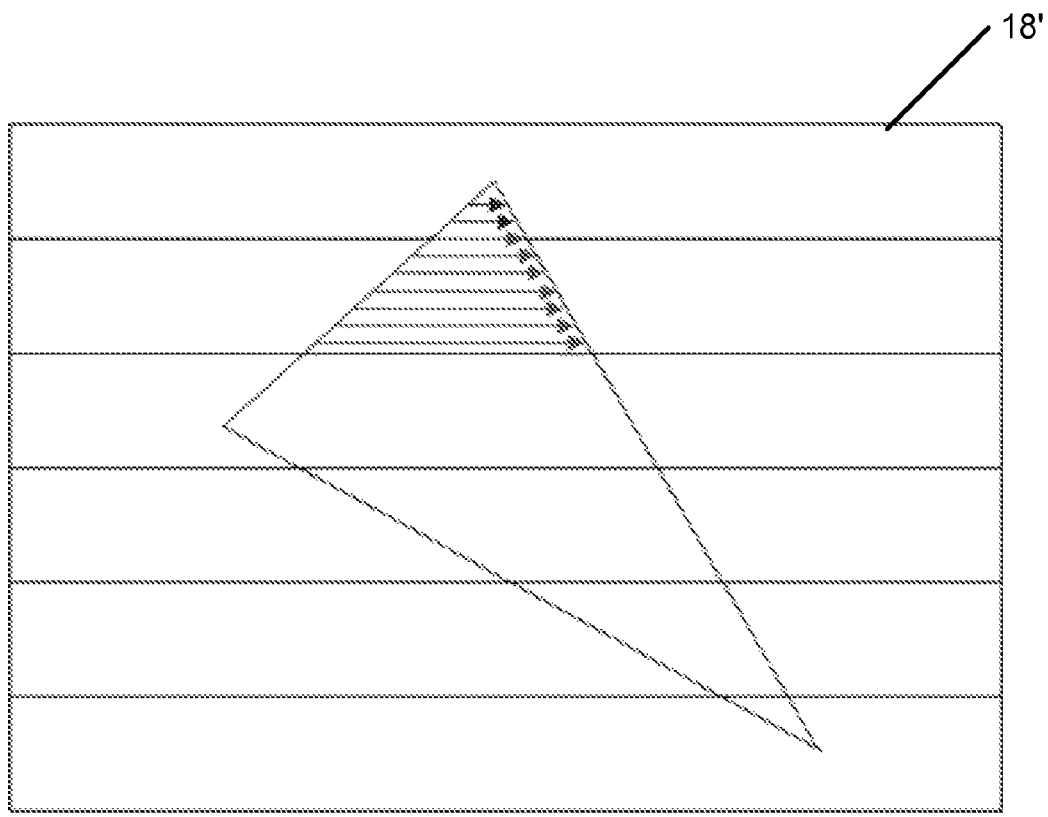
FIG. 9 illustrates the display space being sub-divided into a M×N grid where M=1 and N>1.
Figure 10:
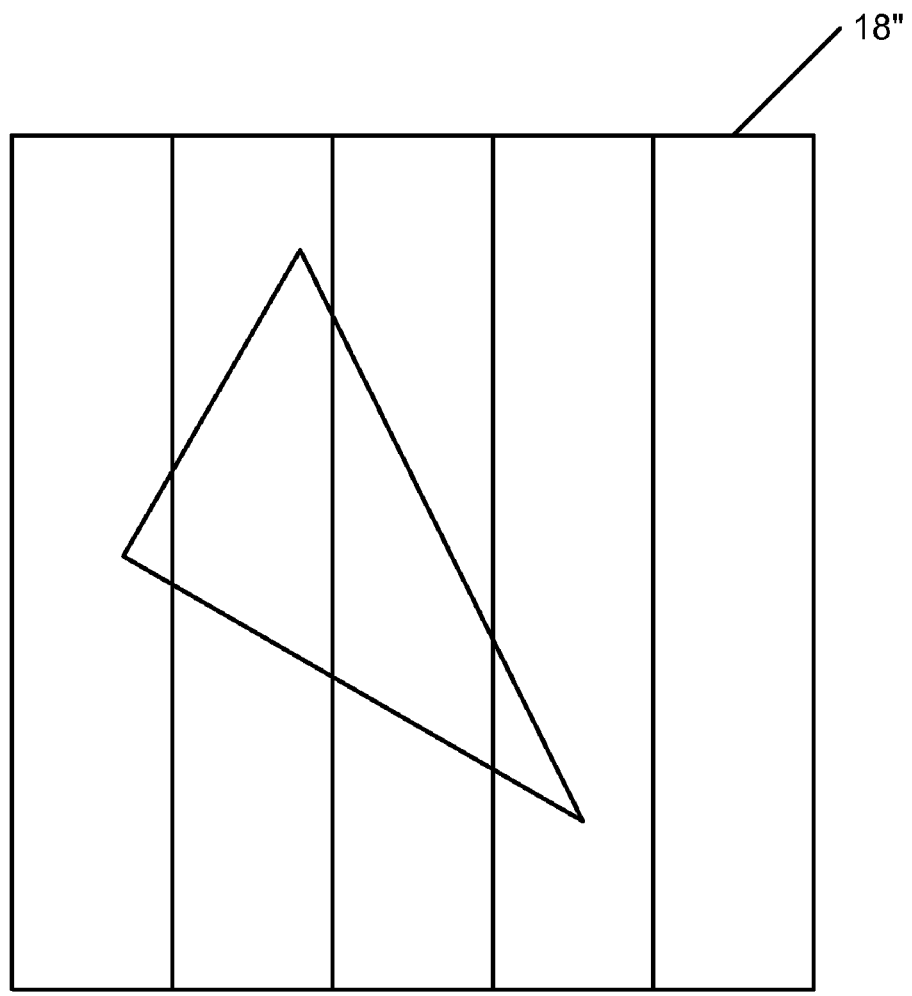
FIG. 10 illustrates the display space being sub-divided into a M×N grid where M>1 and N=1.

In the embodiment shown in FIG. 8A, the display area 18 is divided into M×N sub-screens wherein M>1 and N>1 to create a grid. For illustrative purposes, FIG. 9 shows the display area 18' divided into M×N sub-screens wherein M=1 and N>1. The arrows illustrate the scan or work flow direction. With reference to FIG. 10, the display area 18" is divided into M×N sub-screens wherein M>1 and N=1. Thus, the sub-screens of display area 18" form a series of columns.

The pixel rendering (PR) stage 140 includes rasterization, blending, and texture application operations 142 and hidden surface removal operations 144. Nevertheless, the pixel rendering stage 140 may include other operations defined by OpenGL® or OpenGL® ES. The PR stage 140 converts the information about 3D objects from the VP stage 110 into a bit map that can be displayed in the display area 18 of screen 16. The PR stage 140 processes input triangle sets to produce a pixel representation of a 3D graphics image.

A typical pixel rendering (PR) stage may first take a triangle from a list of the vertex output information. Next the PR stage would take a pixel from the display area and compute the pixel against the triangle to see if it is inside the triangle. If the pixel under evaluation is inside the triangle, the PR stage may perform coloring of the pixel with the corresponding color from the triangle. If the pixel under evaluation is not inside the triangle, the pixel is skipped. The PR stage would then pick the next pixel in the display area 18. The PR stage repeats the above process for other pixels in the display area 18 until all pixels have been evaluated or processed for a triangle. Thus, pixels are processed one at a time.

Then, the typical PR stage would move to the next triangle in the list of vertex output information and repeat the evaluation of the pixels for the current triangle.

The PR stage 140 works in a similar manner with multiple sub-screens or sub-screen tasks. The difference is that the sub-screens have a smaller number of pixels to evaluate or process and multiple sub-screens can be processed independently and in parallel by the processing thread (PT1, PT2, . . . PTX). Thus, the processing time for the PR stage 140 is much quicker then a typical PR stage because less pixels are in each sub-screen and multiple sub-screens can be processed in parallel (with each processing thread working independently towards processing the pixels in a respective one sub-screen).

In the exemplary embodiment, the PR stage 140 is processed using a set of the multiple processing threads PR1, PR2, . . . PRX of the interleaved multi-threading processor 22. The number of threads in the set used for the PR stage 140 may be 2 or more with a maximum of X threads.

In operation, each processing thread PR1, PR2, . . . PRX assigned to the pixel rendering stage 140 seizes an available sub-screen task from the Task list 135 and removes it from the Task list 135. The set of processing threads PR1, PR2, . . . PRX process, in interleaved parallel operations, input triangles to render the pixels in the sub-screens (convert the input triangle information into a bit map for display in the sub-screens). After, a respective one processing thread has completed the pixel rendering operations for the seized sub-screen task, the processing thread moves to the next available sub-screen task in the Task list 135. This operation is repeated until all sub-screens have been processed and the pixel rendering stage 140 is complete.

Figure 12:
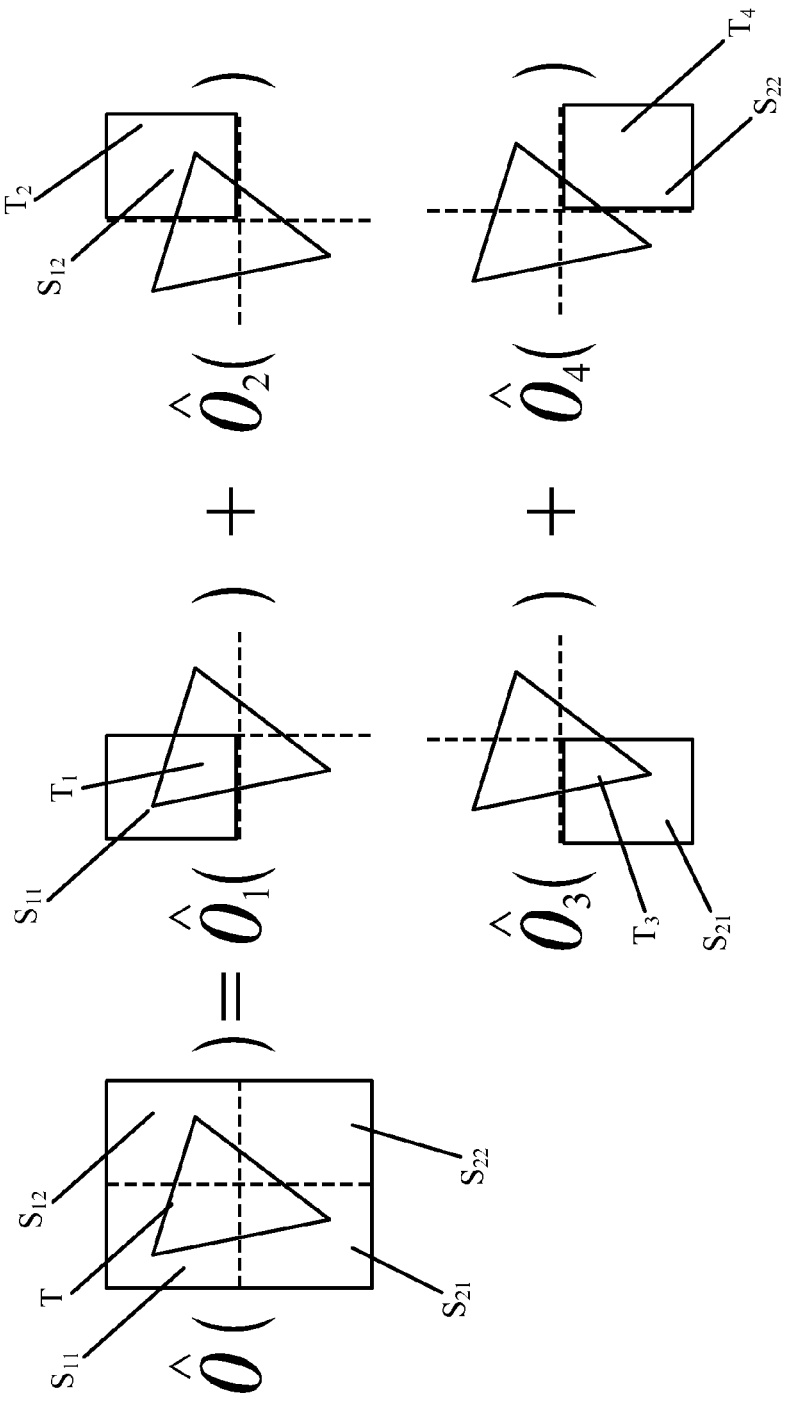
FIG. 12 illustrates a graphical representation of the instruction operations for processing a triangle in an area sub-divided into a set of four sub-divided areas.

With reference to FIGS. 1, 2 and 12, the interleaved multi-threading processor 22 allows the multi-thread processing to be scalable and homogeneous. An operation Ô can be defined by $$\hat{O}(A+B) = \hat{O}(A) + \hat{O}(B)$$

and $$\hat{O}\left(\sum_i T_i\right) = \sum_i \hat{O}(T_i)$$

In FIG. 12, a block of four sub-screens with a single triangle T is shown for pixel rendering. The operation Ô processes sub-screen tasks $S_{11}$, $S_{12}$, $S_{21}$ and $S_{22}$ represented as four (i) sub-screens each with a sub-divided portion (i) of a triangle T. The operation Ô is thus equal to operation $\hat{O}_1$ of the sub-screen $S_{11}$ plus operation $\hat{O}_2$ of the sub-screen $S_{12}$ plus operation $\hat{O}_3$ of the sub-screen $S_{21}$ plus operation $\hat{O}_4$ of the sub-screen $S_{22}$. If all of the operations $\hat{O}_1$, $\hat{O}_2$, $\hat{O}_3$ and $\hat{O}_4$ are processed in parallel, the overall peak performance for processing the pixel rendering stage 140 is thus the peak performance for a processing thread multiplied by the number of processing threads used. The sub-screen $S_{11}$ has a sub-divided portion $T_1$ of pixels for triangle T. The sub-screen $S_{12}$ has a sub-divided portion $T_2$ of pixels for triangle T. The sub-screen $S_{21}$ has a sub-divided portion $T_3$ of pixels for triangle T. The sub-screen $S_{22}$ has a sub-divided portion $T_4$ of pixels for triangle T. For illustrative purposes, the number of threads is four (4). Hence, in this example, the performance would be the performance for one processing thread multiplied by the number of the processing threads. Thus, the PR stage 140 is a quick pixel rendering stage by virtue of its ability to process in parallel pixels from multiple sub-screens.

In addition, the numbers of M and N can be configured after profiling with real application, so that the performance can be further optimized for different situations. Configuring M and N provides another dimension of greater flexibility and scalability. Profiling includes identifying the loading (tick count) of the processing thread or the size or complexity of the operational tasks. Profiling may also include evaluating other components such as parameters associated with the transfer of data and memory capacity from the shared memory 24. With profiling and adjustment, frame rate, screen size, pixel rate, triangle rate, etc. could be used to change or vary M and N and/or to vary the number of processing threads PR1, PR2, . . . PRX for use in the PR stage 140. With profiling and adjustment, the 3D pipeline stages 110, 130 and 140 can be balanced, to optimize the entire performance. The remaining processing threads PR1, PR2, . . . PRX are used for other applications which are running concurrently, such as game-audio.

Figure 13:
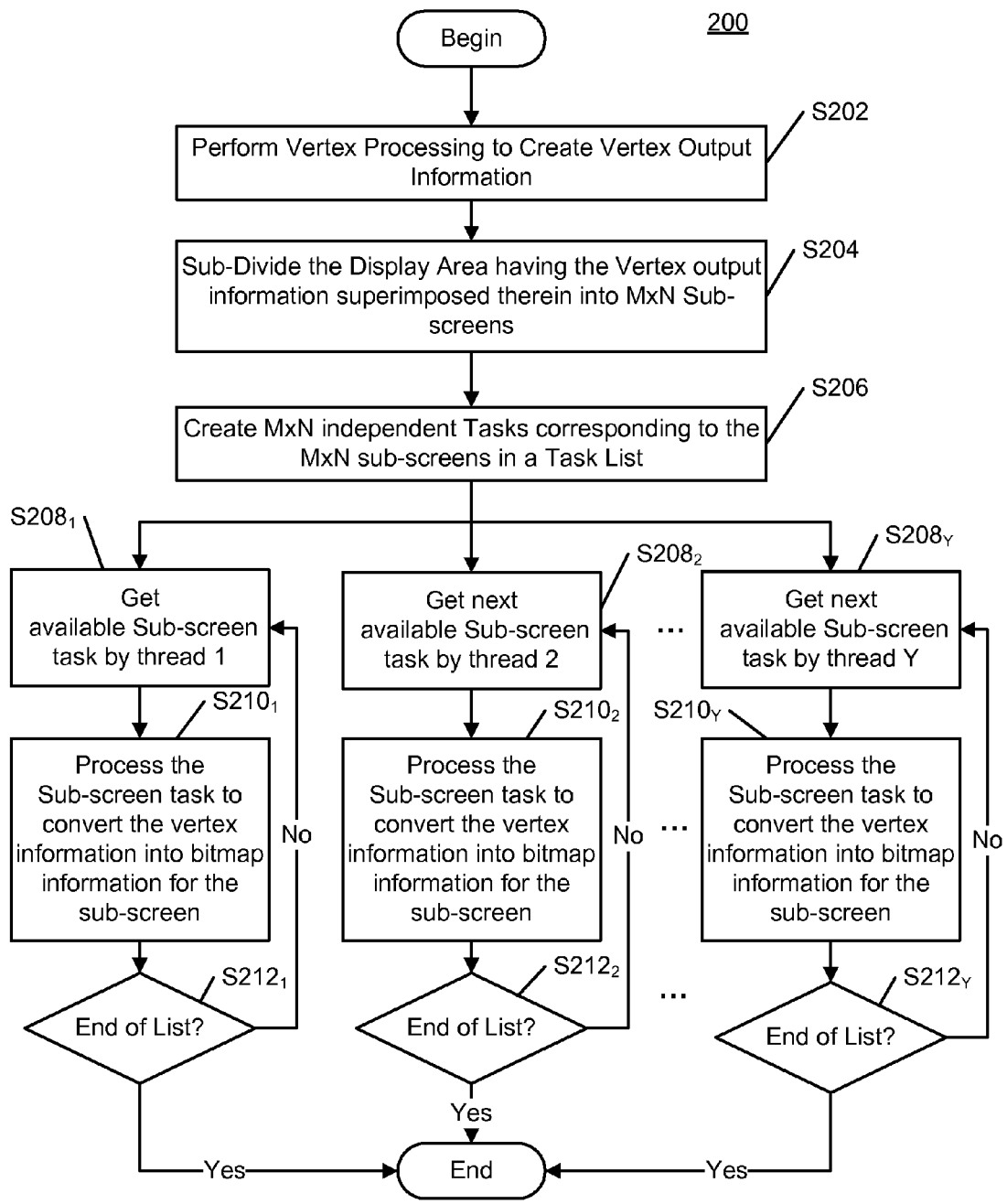
FIG. 13 illustrates the flowchart of the 3D graphics pipeline method using a multi-threading processor.

Referring now to FIG. 13, the flowchart of the 3D graphics pipeline method 200 for use by the 3D graphics pipeline 100 is shown. The method 200 begins with step S202 where the vertex processing is performed to create vertex output information. Step S202 is followed by step S204 where the display area 18, having the vertex output information superimposed therein, is sub-divided into M×N sub-screens. For example, as best seen in FIG. 8A, the triangle T1 expands across the sub-screens $S_{11}$, $S_{21}$ and $S_{22}$ and is sub-divided into its respective sub-divided portions $T1_1$, $T1_2$, $T1_3$ shown in FIG. 8B. Thus, the Task list 135 in FIG. 8B illustrates the sub-divided portions of triangles T1 and T2 (only two triangles shown for illustrative purposes). As can be appreciated, those entries in the Task list 135 from the vertex output information that does not have associated therewith a triangle or has a smaller sub-divided portion of a triangle may be processed quicker. Hence, before the pixel rendering stage 140 displays a 3D image representative of the triangle on the display area 18, the processing for all sub-divided portions of the triangle should be complete.

Step S204 is followed by step S206 where the sub-screen tasks with or without sub-portions of the triangles are created and placed in the Task list 135. Step S206 is followed by step $S208_1$, $208_2$, and $208_Y$ where Y is the number of the processing threads (2 or more) in the set used for the pixel rendering stage 140. At step $S208_1$, the first processing thread (hereinafter referred to as "thread 1") gets the (first) available sub-screen task (FIG. 8B) and processes each pixel in the sub-screen task at step $S210_1$, especially those pixels determined to be within or inside of a triangle or triangle portion associated with the task. Step $S210_1$ is followed by step $S212_1$ where a determination is made whether it is the end of the Task list 135. If the determination is "YES," the processing by thread 1 is ended. Otherwise, if the determination is "NO," step $S212_1$ returns to step $S208_1$. The operation of the second processing thread (hereinafter referred to as "thread 2") is essentially the same. Thread 2 gets or seizes the next available sub-screen task in the Task list 135. Step $S208_2$ is followed by step $S210_2$ where the sub-screen task is processed. Step $S208_2$ is followed by step $S210_2$. Step $S210_2$ is followed by step $S212_2$. At step $S212_2$, a determination is made whether there are any more tasks in the Task list 135. If the determination at step $S212_2$ is "NO," the method ends. Otherwise, if the determination is "YES," step $S212_2$ returns to step $S208_2$.

Step $S208_Y$ gets or seizes the $Y^{th}$ available sub-screen task by thread Y. Step $S208_Y$ is followed by step $S210_Y$ where the sub-screen task is processed. Step $S210_Y$ is followed by step $S212_Y$ where a determination is made whether there are any more tasks in the Task list 135. If the determination is "NO," the method ends. Otherwise, if the determination is "YES," step $S212_Y$ returns to step $S208_Y$.

The processing carried out during step $S210_1$, $S210_2$ and $S210_Y$ performs the rasterization, blending, texture application operations 142 and the hidden surface removal operations 144. With specific reference to FIG. 11, the squares with a center dot denote pixels P. Some of the pixels P are inside of the triangle T11 while some pixels are outside of the triangle T11. Each vertex V1, V2 and V3 has a color value attached with smooth shading. Linear interpolation is used to calculate the color values at each pixel P. The vertexes V1, V2 and V3 are used to form triangle T11 and locate such triangle within the display area 18. The colors are calculated at each pixel center, denoted by the black dot, in the center of the square. Various parameters are interpolated including a Z-depth, alpha, fog and texture.

Referring again to FIGS. 2-4, in this example, there are six (6) threads PT1, PT2, PT3, PT4, PT5 and PT6. The first thread PT1 can be used to process the VP stage 110. The second thread PT2 can be used to process the SSD stage 130. The remaining four threads PT3, PT4, PT5 and PT6 would be used to process sub-screen tasks from the Task List 135 in parallel. Here, the processing thread PT3 would get the first available sub-screen task 1,1 and process the pixels in the seized first sub-screen task 1,1. The processing thread PT4 would get the next ($2^{nd}$) available sub-screen task 1,2 and process the pixels in the seized sub-screen task 1,2. The processing thread PT5 would get the next ($3^{rd}$) available sub-screen task 1,3 and process the pixels in the seized sub-screen task 1,3 (assuming M is greater than 3).

Assuming M is 4, the processing thread PT6 would get the next ($4^{th}$) available sub-screen task 1,M and process the pixels in the seized sub-screen task 1,M. As the processing threads PT3, PT4, PT5 and PT6 complete their each sub-screen task, additional sub-screen tasks would be seized and processed in parallel until the Task list 135 is empty.

In the embodiment described in FIG. 13, for load balancing of the operations of the 3D graphics pipeline 100, at least one of the processing threads used by the 3D graphics pipeline 100 may be employed to process all three of the 3D pipeline stages 110, 130 and 140. For illustrative purposes only, thread 1 may be employed to perform steps S202, S204, S206 as well as steps $S208_1$, $210_1$ and $212_1$ If one processing thread performs 3 Mpixel/sec (MIPS) rendering, it would take approximately 30 instruction packets to process one pixel. This is about 100 instructions per pixel in average. Reserving two of the six threads for the VP stage 110 and the SSD stage 130 and the remaining four processing threads for the PR stage 140 would support a VGA resolution which is four times the performance (12 Mpixel/sec) of a dedicated hardware graphics accelerator.

Because all processing threads share the same memory 24, the processing threads can all process the same set of input triangle data (sub-screen tasks) very efficiently (without duplication) using the mutex tool.

The pixel rendering stage 140 is the last pipeline stage of the 3D graphics pipeline 100. The PR stage 140 processes the input triangle list to produce a pixel representation of a 3D graphics image. The 3D graphics pipeline 100 described above improves the performance (in pixel per second) of the PR stage 140. The interleaved multi-thread processor 22 increases the performance by a multiple of the number of the processing threads running in parallel to process the Task list 135.

An advantage of the 3D graphics pipeline architecture is its flexibility in allowing adjustment of the numbers M and N. By increasing the number M and N, the MIPS requirement decreases for the pixel rendering stage 140. Because each sub-screen becomes smaller, the rendering task becomes simpler. This helps to increase the performance of multiple processing threads. The processing threads can also be used for other concurrent applications, such as audio.

As can be readily seen, the software implementation, described herein, for rendering 3D graphics images has a higher performance than hardware implementation of a dedicated graphics accelerator. In comparison to a hardware implementation of a graphics accelerator, the embodiment described herein is flexible and scalable. Because the embodiment is flexible, it is easy to extend the software code for adding new features, support higher versions of the 3D graphics standard (such as OpenGL ES 1.0, 1.1 . . . ), and support different application configurations and custom requirements. The scalable feature of the embodiment allows for different performance requirements (frame rate, screen size, pixel rate, triangle rate, etc. . . . ), to optimize silicon cost and system power consumption This embodiment also enables the software implementation to be used with a low cost and low power processor, instead of using a high end processor with multi-GHz clock speed to reach the same performance.

Figure 14:
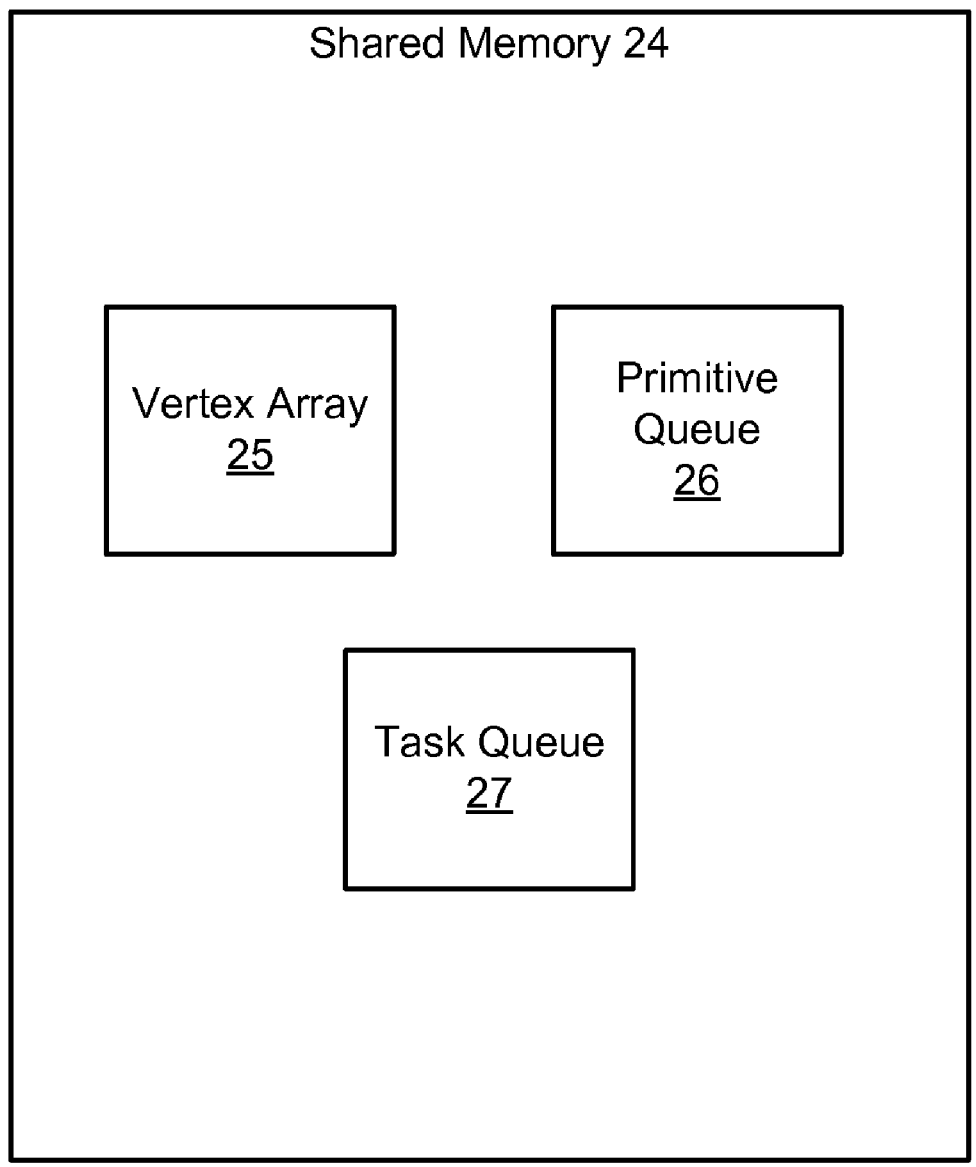
FIG. 14 illustrates a general block diagram pipeline queues in the shared memory.

Referring now to FIG. 14, the shared memory 24 includes a variety of queues for the 3D graphics pipeline 100. The queues include a vertex array 25, a primitive queue 26 and a Task queue 27. Nevertheless, additional queues or buffers may be provided for the tiers or layers of the VP stage 140. As previously described in relation to FIG. 7, the VP stage 110 includes model view transform operations 112, projection operations 114, culling operations 116, lighting and coloring operations 118, primitive assembly operations 120, clipping (i.e. user-defined clipping) operations 122, and perspective division and viewport operations 124. The operations in the VP stage 110 are tiered or layered such that a lower layer or tier, such as primitive assembly operations 120 and clipping operations 122, are dependent on a higher tier or layer, such as model view transform operations 112.

The vertex array 25 includes the vertex coordinates from the model view transform operations 112. The vertex array 25 contains attributes for each vertex, such as vertex positions in model coordinates, color for each vertex, and texture coordinates. The primitive queue 26 is populated by the primitive assembly operations 120. The Task queue 27 is populated with the Task list 135 from the SSD stage 130. However, tiers or layers of the VP stage 110 below the primitive assembly operations 120 depend on data populated in the primitive queue 26 to create the vertex output information needed by the SSD stage 130. The SSD stage 130 creates the necessary Task list 135 for use by the PR stage 140. However, at the same time, the primitive assembly operations 120 is dependent on data from a higher tier or layer, such as the model view transform operations 112. The description above related to the primitive assembly operations 120 and the model view transform operations 112 is for illustrative purposes only and applies to other tiers or layers in the VP stage 110.

Figure 15:
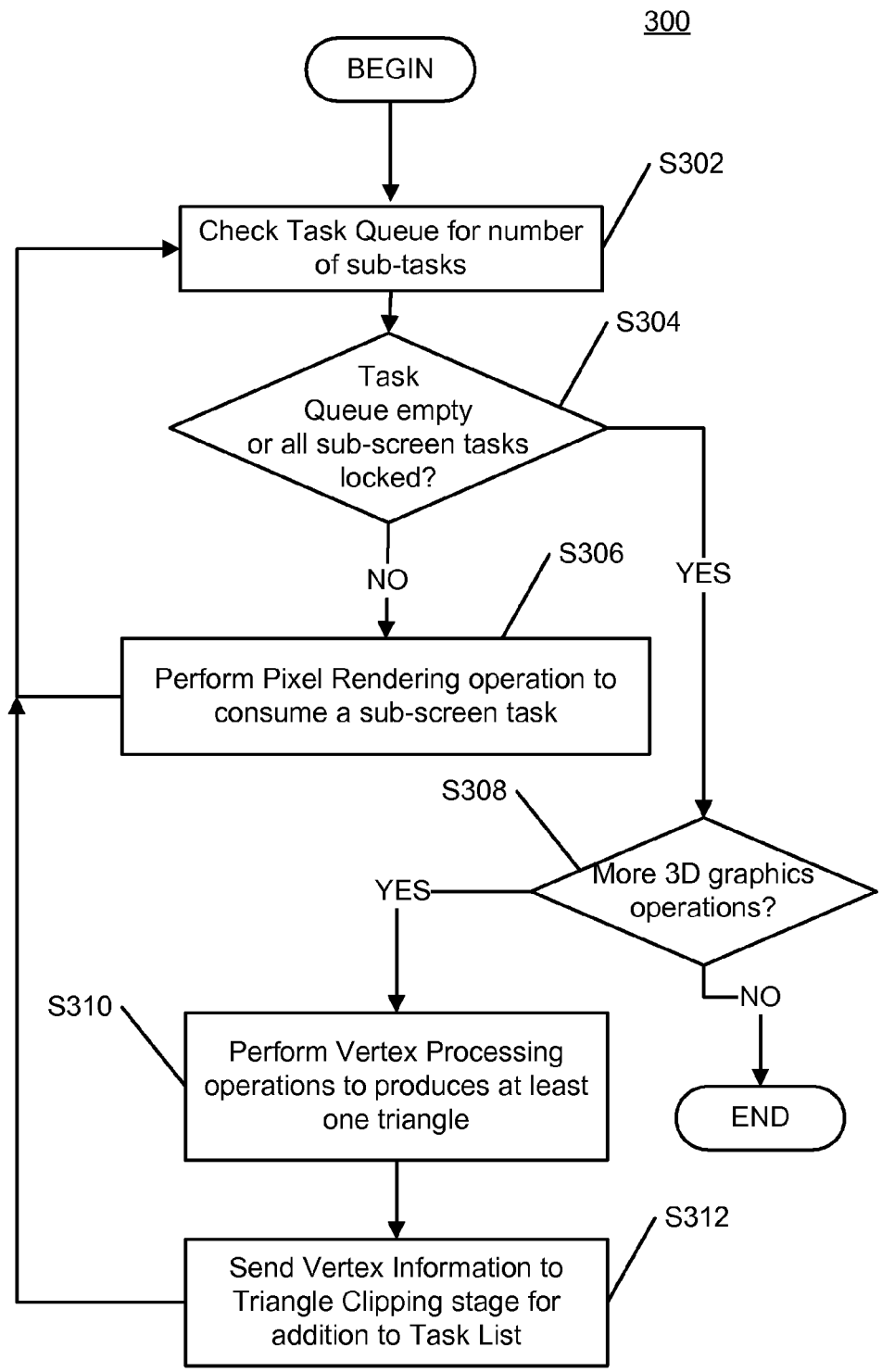
FIG. 15 illustrates a flowchart of a method for load balancing the 3D graphics pipeline on a per thread basis.

Referring now to FIG. 15, a flowchart of a method 300 for load balancing the 3D graphics pipeline 100 on a per processing thread basis is shown. In this embodiment, processing the PR stage 140 by one or more of the processing threads PT1, PT2, . . . PTX is given priority over the VP and SSD stages 110 and 130 in the 3D graphics pipeline 100. The processing threads PT1, PT2, . . . PTX or a subset of processing threads PT 1, PT2, . . . PTX, assigned to process the operations of the 3D graphics pipeline 100, are operable to process in parallel and independently operations of the 3D graphics pipeline 100. The method 300 would be performed individually and independently by one or more of the processing threads PT1, PT2, . . . PTX or sub-set of processing threads assigned to the operations of the 3D graphics pipeline 100.

The method 300 begins with step S302 where one of the processing threads PT1, PT2, . . . PTX initially checks the number of sub-screen tasks in the Task list 135 in the Task queue 27 of the shared memory 24, created during the SSD stage 130. The operations of the SSD stage 130 correspond to steps S204 and S206 of FIG. 13. Step S302 is followed by step S304 where a determination is made whether the Task queue 27 is empty or all of the remaining sub-screen tasks in the Task list 135 are locked by other processing threads. If the determination is "NO," at step S304, then step S304 is followed by step S306 where the processing thread performs the operations of the PR stage 140 (such as, steps S208₁, 210₁ and 212₁) to consume or process one sub-screen task. Thereafter, step S306 loops back to step S302.

However, if the determination is "YES" at step S304, then step S304 is followed by step S308 where a determination is made whether there are any more 3D graphics operations. If the determination at step S308 is "NO" and the Task queue 27 is empty or being emptied (Step S304) by the last pipeline stage (PR stage 140), the operations of the 3D graphics pipeline 100 are essentially complete. Thus, the method 300 ends. Step S308 is just one example of the criteria used to end the method 300. Thus, other criteria may be used and placed in the method 300 accordingly.

If the determination at step S308 is "YES," step S308 is followed by step S310 where vertex processing in the VP stage 110 is performed to produce vertex output information that represents at least one triangle. Step S310 is followed by step S312 where the vertex information created at step S310 is sent to the SSD stage 130 for addition to the Task list 135 in the Task queue 27. Step S312 then loops back to step S302 where the processing thread checks the Task queue 27 again. Generally, at step S310, the processing thread would call a function of the VP stage 110.

As a further note, the evaluating criteria at step S304 may be varied. For example, in the beginning, the evaluation criteria at step S304 may compare the number of sub-screen tasks to a watermark (FIG. 6) or a threshold value indicating the number of sub-screen tasks in the Task queue 27 for use by the PR stage 140. If the number of sub-screen tasks is lower than or below the watermark (i.e., indicating that there are not many sub-screen tasks in the Task queue for pixel rendering), then step S304 is followed by step S308. However, if the number of sub-screen tasks is greater than or above the watermark, then the processing thread would perform the operations of the PR stage 140 at step S306.

However, as the number of sub-screen tasks in the Task queue 27 remains below the watermark level after a predetermined number of loops, the evaluation criteria may be changed (lowered). For example, the evaluation criteria may be set to empty and/or all sub-screen tasks are locked. Accordingly, the evaluation criteria of S304 may be varied back and forth to balance the loading between the PR stage 140 and the VP stage 110 with preference toward the PR stage 140.

Regarding the tiers or layers of the VP stage 110, alternately at step S310, of FIG. 15, tier checks for data in various queues may be evaluated. By way of example, the processing thread during step S310 may first check the primitive queue 26 or other intermediary tier or layer before checking any of the other higher tiers or layers in the VP stage 110. If data in an intermediary tier or layer is in a corresponding queue, then the processing thread may process data from the tier or layer for use by the lower tiers or layers to produce the vertex output information.

For VP stage balancing, a processing thread would seize and lock data in any of the queues in a similar manner as described above in relation to FIG. 13.

The method 300 allows every processing thread PT1, PT2, ... PTX to be created equal and run identical program code which is easier to maintain and add features. The method 300 may also avoid switching overhead between the processing threads.

The method 300 automatically balances the work load between the stages of the 3D graphics pipeline 100 with priority for the PR stage 140. Furthermore, the load balancing automatically balances the work load between each of the pipeline stages 110, 130 and 140 without a manager thread. The load balancing is scalable by adding or removing threads from processing operations of the 3D graphics pipeline 100. The load balancing requires little communication between each of the processing threads with minimal overhead.

In exemplary embodiments, the method 300 may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium.

The term "computer storage medium" refers herein to any medium adapted for storing the instructions that cause the computer to execute the method. By way of example, and not limitation, the computer storage medium may comprise solid-sate memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A processor comprising:
   a plurality of processing threads configured to:
   perform vertex processing operations to produce vertex output information;
   divide a display area into a plurality of sub-screens;
   store the vertex output information as a plurality of sub-screen tasks in a list of sub-screen tasks, wherein a sub-screen task comprises a plurality of the vertex output information for a particular sub-screen of the plurality of sub-screens;
   prioritize pixel rendering operations over available vertex processing operations when one of the sub-screen tasks in the list of sub-screen tasks is available for the pixel rendering operations.

2. The processor of claim 1, wherein the plurality of processing threads operate in parallel and independently.

3. The processor of claim 1, wherein as each processing thread performs the vertex processing operations, the processing thread creates vertex output information for a 3D graphics image.

4. The processor of claim 1, wherein each processing thread, when performing the pixel rendering operations, performs rasterization on pixels of the sub-screen task, blending of the pixels, and texturing of the pixels.

5. The processor of claim 1, wherein each processing thread when performing the vertex processing operations checks a queue for data of an intermediary tier of the vertex processing operations and processes the data of the intermediary tier if the queue has the data.

6. The processor of claim 5, wherein the processing thread when performing the vertex processing operations processes data from a queue of a higher tier of the vertex processing operations if the queue of the intermediary tier is empty.

7. The processor of claim 1, wherein the processor is embedded in one of a personal digital assistant (PDA), a palm pilot, a mobile telephone, a cellular telephone, a satellite telephone, a laptop, a Notebook, a Tablet PC and a wireless communication device.

8. A wireless device comprising:
a processor having a plurality of processing threads, each processing thread configured to:
perform vertex processing operations to produce vertex output information;
divide a display area into a plurality of sub-screens;
store the vertex output information as a plurality of sub-screen tasks in a list of sub-screen tasks, wherein a sub-screen task comprises a plurality of the vertex output information for a particular sub-screen of the plurality of sub-screens;
prioritize pixel rendering operations over available vertex processing operations when one of the sub-screen tasks in the list of sub-screen tasks is available for the pixel rendering operations; and
a memory coupled to the processor.

9. The device of claim 8, wherein the plurality of processing threads operate in parallel and independently.

10. The device of claim 8, wherein as each processing thread performs the vertex processing operations, the processing thread creates vertex output information for a 3D graphics image.

11. The device of claim 8, wherein each processing thread, when performing the pixel rendering operations, performs rasterization on pixels of the sub-screen task, blending of the pixels, and texturing of the pixels.

12. The wireless device of claim 8, wherein each processing thread when performing the vertex processing operations checks a queue for data of an intermediary tier of the vertex processing operations and processes the data of the intermediary tier if the queue has the data.

13. The wireless device of claim 12, wherein the processing thread when performing the vertex processing operations processes data from a queue of a higher tier of the vertex processing operations if the queue of the intermediary tier is empty.

14. A non-transitory, computer-readable storage medium comprising instructions that when executed cause a plurality of processing threads of a processor to:
perform vertex processing operations to produce vertex output information;
divide a display area into a plurality of sub-screens;
store the vertex output information as a plurality of sub-screen tasks in a list of sub-screen tasks, wherein a sub-screen task comprises a plurality of the vertex output information for a particular sub-screen of the plurality of sub-screens;
prioritize pixel rendering operations over the vertex processing operations when one of the sub-screen tasks in the list of sub-screen tasks is available for the pixel rendering operations.

15. The non-transitory, computer-readable storage medium of claim 14, wherein the plurality of processing threads operate in parallel and independently.

16. The non-transitory, computer-readable storage medium of claim 14, wherein as each processing thread performs the vertex processing operations, the processing thread creates vertex output information for a 3D graphics image.

17. The non-transitory, computer-readable storage medium of claim 14, wherein each processing thread, when performing the pixel rendering operations, performs rasterization on pixels of the sub-screen task, blending of the pixels, and texturing of the pixels.

18. The non-transitory, computer-readable storage medium of claim 14, wherein each processing thread when performing the vertex processing operations checks a queue for data of an intermediary tier of the vertex processing operations and processes the data of the intermediary tier if the queue has the data.

19. The non-transitory, computer-readable storage medium of claim 18, wherein each processing thread when performing the vertex processing operations processes data from a queue of a higher tier of the vertex processing operations if the queue of the intermediary tier is empty.

20. An apparatus comprising a processor having a plurality of processing threads, wherein the processing threads comprise:
means for performing vertex processing operations to produce vertex output information;
means for dividing a display area into a plurality of sub-screens;
means for storing the vertex output information as a plurality of sub-screen tasks in a list of sub-screen tasks, wherein a sub-screen task comprises a plurality of the vertex output information for a particular sub-screen of the plurality of sub-screens; and
means for prioritizing pixel rendering operations over available vertex processing operations when one of the sub-screen tasks in the list of sub-screen tasks is available for the pixel rendering operations.

21. The apparatus of claim 20, wherein the plurality of processing threads operate in parallel and independently.

22. The apparatus of claim 20, wherein as each processing thread performs the vertex processing operations, the processing thread creates vertex output information for a 3D graphics image.

23. The apparatus of claim 20, wherein each processing thread, when performing the pixel rendering operations, performs rasterization on pixels of the sub-screen task, blending of the pixels, and texturing of the pixels.

24. The apparatus of claim 20, wherein each processing thread when performing the vertex processing operations checks a queue for data of an intermediary tier of the vertex processing operations and processes the data of the intermediary tier if the queue has the data.

25. The apparatus of claim 24, wherein each processing thread when performing the vertex processing operations processes data from a queue of a higher tier of the vertex processing operations if the queue of the intermediary tier is empty.

26. A method comprising:
performing vertex processing operations to produce vertex output information;
dividing a display area into a plurality of sub-screens;
storing the vertex output information as a plurality of sub-screen tasks in a list of sub-screen tasks, wherein a sub-screen task comprises a plurality of the vertex output information for a particular sub-screen of the plurality of sub-screens;
prioritizing pixel rendering operations over available vertex processing operations when one of the sub-screen tasks in the list of sub-screen tasks is available for the pixel rendering operations,
wherein the method is performed by a plurality of processing threads of a multi-threaded processor.

27. The method of claim 26, wherein the vertex output information is for a 3D graphics image.

28. The method of claim 26, further comprising:
performing rasterization on pixels of the sub-screen task, blending of the pixels, and texturing of the pixels.

29. The method of claim 26, further comprising:
checking a queue for data of an intermediary tier of the vertex processing operations; and
processing the data of the intermediary tier if the queue has the data.

30. The method of claim 26, further comprising:
processing data from a queue of a higher tier of the vertex processing operations if the queue of the intermediary tier is empty.

* * * * *